(12) United States Patent
Agiwal et al.

(10) Patent No.: US 11,553,403 B2
(45) Date of Patent: Jan. 10, 2023

(54) APPARATUS AND METHOD FOR TRANSMITTING AND RECEIVING DEVICE TO DEVICE DISCOVERY MESSAGE IN WIRELESS COMMUNICATION SYSTEM SUPPORTING DEVICE TO DEVICE SCHEME

(71) Applicant: Samsung Electronics Co., Ltd., Gyeonggi-do (KR)

(72) Inventors: Anil Agiwal, Su-won-si (KR); Young-Bin Chang, Anyang-si (KR); June Hwang, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/565,127

(22) PCT Filed: Apr. 6, 2016

(86) PCT No.: PCT/KR2016/003588
§ 371 (c)(1),
(2) Date: Oct. 6, 2017

(87) PCT Pub. No.: WO2016/163747
PCT Pub. Date: Oct. 13, 2016

(65) Prior Publication Data
US 2018/0098268 A1    Apr. 5, 2018

(30) Foreign Application Priority Data

Apr. 6, 2015  (IN) .......................... 1801/CHE/2015

(51) Int. Cl.
*H04W 48/14*    (2009.01)
*H04W 8/00*     (2009.01)
(Continued)

(52) U.S. Cl.
CPC ............. *H04W 48/14* (2013.01); *H04W 4/90* (2018.02); *H04W 8/005* (2013.01); *H04W 48/08* (2013.01);
(Continued)

(58) Field of Classification Search
CPC ..... H04W 48/16; H04W 48/14; H04W 48/08; H04W 76/10; H04W 8/005
See application file for complete search history.

(56) References Cited

U.S. PATENT DOCUMENTS 9,992,782 B2 *  6/2018  Kalhan ................. H04W 72/10
10,743,231 B2 * 8/2020  Dong ...................... H04W 4/06
(Continued)

FOREIGN PATENT DOCUMENTS

WO      2015020448 A1      2/2015
WO   WO-2015020448 A1 *   2/2015  .......... H04W 72/042

OTHER PUBLICATIONS

Alcatel-Lucent Shanghai Bell et al.; "Resource Allocation for D2D Discovery"; 3GPP TSG RAN WG1 Meeting #74bis; R1-134232; Guangzhou, P.R. China; Oct. 7-11, 2013; 2 pages.
(Continued)

*Primary Examiner* — Syed Ali

(57) ABSTRACT

The present disclosure relates to a pre-5th-generation (5G) or 5G communication system to be provided for supporting higher data rates beyond 4th-generation (4G) communication system such as a long term evolution (LTE). The present disclosure relates to a method of an evolved node B (eNB), comprising: transmitting at least one of first information as information on at least one first type-discovery resource pool including first type-discovery resources and second information as information on at least one second type-discovery resource pool including second type-discovery resources, or transmitting discovery resource information on at least one
(Continued)

discovery resource which corresponds to a discovery resource type requested from a user equipment (UE).

4 Claims, 9 Drawing Sheets

(51) Int. Cl.
    *H04W 48/08*     (2009.01)
    *H04W 4/90*     (2018.01)
    *H04W 76/14*     (2018.01)
    *H04W 48/16*     (2009.01)
    *H04W 4/70*     (2018.01)

(52) U.S. Cl.
    CPC ........... *H04W 48/16* (2013.01); *H04W 76/14* (2018.02); *H04W 4/70* (2018.02)

(56) References Cited

U.S. PATENT DOCUMENTS

| | | | |
|---|---|---|---|
| 11,122,530 B2* | 9/2021 | Zhang | H04W 8/005 |
| 2013/0109301 A1 | 5/2013 | Hakola et al. | |
| 2015/0245193 A1* | 8/2015 | Xiong | H04W 8/005 |
| | | | 370/328 |
| 2015/0271657 A1* | 9/2015 | Xiong | H04W 8/005 |
| | | | 370/329 |
| 2015/0326362 A1* | 11/2015 | Xiong | H04W 76/10 |
| | | | 370/336 |
| 2017/0064534 A1* | 3/2017 | Loehr | H04W 72/0413 |
| 2017/0078863 A1* | 3/2017 | Kim | H04W 48/16 |
| 2017/0105111 A1* | 4/2017 | Li | H04W 8/005 |
| 2017/0353819 A1* | 12/2017 | Yin | H04W 72/1284 |
| 2018/0014262 A1* | 1/2018 | Lee | H04W 52/383 |
| 2018/0020339 A1* | 1/2018 | Agiwal | H04W 72/0453 |
| 2018/0098268 A1* | 4/2018 | Agiwal | H04W 48/14 |
| 2018/0288685 A1* | 10/2018 | Jung | H04W 76/27 |

OTHER PUBLICATIONS

Ericsson; "Synchronization Procedures for D2D Discovery and Communication"; 3GPP TSG RAN WG1 Meeting #76 R1-140773; Prague, Czech Republic; Feb. 10-14, 2014; 7 pages.
Ericsson; "On Scheduling Procedure for D2D"; 3GPP TSG-RAN WG1 Meeting #76; R1-140778; Prague, Czech Republic; Feb. 10-14, 2014; 5 pages.
ETRI, "Association between in-coverage Mode-2 and out-of-coverage Mode-2," R1-144915, 3GPP TSG RAN WG1 Meeting #79, San Francisco, USA, Nov. 17-21, 2014, 2 pages.
Intel Corporation, "On Overlap of Multiple D2D Resource Pools and UE Behavior," R1-144652, 3GPP TSG RAN WG1 Meeting #79, San Francisco, USA, Nov. 17-21, 2014, 6 pages.
Interdigital Communications, "Multiple Tx Resource Pools for ProSe Discovery," R2-145211, 3GPP TSG-RAN WG2 #88, San Francisco, USA, Nov. 17-21, 2014, 4 pages.
LG Electronics Inc., "Discovery out of coverage," R2-154883, 3GPP TSG-RAN WG2 #91bis, Malmo, Sweden, Oct. 5-9, 2015, 3 pages.
Qualcomm Incorporated, "Signaling Details for ProSe Direct Discovery," R2-144548, 3GPP TSG-RAN WG2 #87Bis, Shanghai, P.R. China, Oct. 6-10, 2014, 9 pages.
Samsung, "On D2D communication related to out-of-coverage UE with TX timing not from eNB," R1-144728, 3GPP TSG RAN WG1 #79, San Francisco, USA, Nov. 17-21, 2014, 5 pages.
Communication from a foreign patent office in a foreign counterpart application, European Patent Office, "Supplementary European Search Report," Application No. EP 16776850.6, Mar. 7, 2018, 10 pages.

\* cited by examiner

APPARATUS AND METHOD FOR TRANSMITTING AND RECEIVING DEVICE TO DEVICE DISCOVERY MESSAGE IN WIRELESS COMMUNICATION SYSTEM SUPPORTING DEVICE TO DEVICE SCHEME

CROSS-REFERENCE TO RELATED APPLICATIONS

The present application claims priority under 35 U.S.C. § 365 to International Patent Application No. PCT/KR2016/003588 filed on Apr. 6, 2016, entitled "APPARATUS AND METHOD FOR TRANSMITTING AND RECEIVING DEVICE TO DEVICE DISCOVERY MESSAGE IN WIRELESS COMMUNICATION SYSTEM SUPPORTING DEVICE TO DEVICE SCHEME", and to Indian Patent Application No. 1801/CHE/2015 filed on Apr. 6, 2015, each of which are incorporated herein by reference into the present disclosure as if fully set forth herein.

TECHNICAL FIELD

The present disclosure relates to an apparatus and method for transmitting and receiving a message in a wireless communication system supporting a device to device (D2D) scheme, and more particularly, to an apparatus and method for transmitting and receiving a D2D discovery message in a wireless communication system supporting a D2D scheme.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

D2D communication is being studied in communication standard groups to enable a D2D discovery service and a D2D data communication service between user equipments (UEs).

A D2D discovery process is a process for determining whether that a D2D-enabled UE is in proximity of another D2D-enabled UE. A discovering D2D-enabled UE determines whether another D2D-enabled UE is interested in the discovering D2D-enabled UE based on the D2D discovery process. The another D2D-enabled UE is interested in the discovering D2D-enabled UE if proximity of the another D2D-enabled UE needs to be known by one or more authorized applications for the discovering D2D-enabled UE. For example, a social networking application can be enabled to use D2D discovery feature. The D2D discovery process enables a D2D-enabled UE of a given user of the social networking application to discovery D2D-enabled UEs of friends of the given user of the social networking application and/or be discovered by the D2D-enabled UEs of the friends of the given user of the social networking application. In another example, the D2D discovery process may enable a D2D-enabled UE of a given user of a search application to discover stores, restaurants, and/or the like which are interested in proximity of the D2D-enabled UE. For example, the D2D-enabled UE discovers other D2D-enabled UEs in proximity of the D2D-enabled UE using direct UE-to-UE signaling.

In a D2D scheme, a D2D UE transmits a D2D discovery message using a time resource and a frequency resource, e.g., a discovery resource, which are configured by an evolved node B (eNB) which manages a serving cell or a non-serving cell of the D2D UE in order to perform a discovery operation. Here, a D2D UE denotes a UE which supports a D2D scheme.

Recently, a study for a scheme of using a discovery process for a public safety (PS), e.g., for discovering group members.

A difference between an existing discovery process and a discovery process for a PS service will be described below. For convenience, a discovery process for a PS service will be referred to as "PS discovery process".

Firstly, the existing discovery process is performed within a network coverage, but the PS discovery process needs to be performed within the network coverage, out of the network coverage, and in a partial network coverage. In a case of the partial network coverage scenario, transmission power within a network coverage is controlled based on path loss between a UE and an eNB, but transmission power out of the network coverage is not controlled based on the path loss between the UE and the eNB, so transmission power of a UE which is within the network coverage is different from transmission power of a UE which is out of the network coverage. This transmission power difference causes interference between transmission of a D2D discovery message within a network coverage and transmission of a D2D discovery message out of the network coverage.

Additionally, a D2D discovery message for a PS discovery process and a D2D discovery message for a non-PS discovery process may be transmitted on the same carrier. Here, a non-PS discovery process denotes a discovery process which is not a PS discovery process. So, a PS UE interested in PS discovery message transmission transmits in the same discovery resources as a non-PS UE interested in non-PS discovery message transmission leading to collision.

Also, a PS UE interested in PS discovery message reception needs to monitor all discovery resources and a non-PS UE interested in non-PS discovery message reception needs to monitor all discovery resources. This causes unnecessary power consumption in a UE. Here, a PS UE denotes a UE which performs a PS discovery process and a non-PS UE denotes a UE which performs a non-PS discovery process.

Information included in a D2D discovery message used for a PS discovery process may be different from information included in a D2D discovery message used for a non-PS discovery process. So, a PS UE and a non-PS UE need to be able to identify a PS discovery message and a non-PS discovery message. Here, a PS discovery message denotes a D2D discovery message used for a PS discovery process and a non-PS discovery message denotes a D2D discovery message used for a non-PS discovery process.

Further, it is possible that a PS discovery process and a non-PS discovery process are supported in different carriers. So, a UE needs to be able to identify a carrier on which the UE needs to perform a discovery process. So, there is a need for a scheme for identifying a carrier on which a UE needs to perform a discovery process.

So, there is a need for a method for efficiently transmitting and receiving a D2D discovery message which considers the above issues.

The above information is presented as background information only to assist with an understanding of the present disclosure. No determination has been made, and no assertion is made, as to whether any of the above might be applicable as prior art with regard to the present disclosure.

SUMMARY

An embodiment of the present disclosure proposes an apparatus and method for transmitting and receiving a D2D discovery message in a wireless communication system supporting a D2D scheme.

An embodiment of the present disclosure proposes an apparatus and method for transmitting and receiving a D2D discovery message by considering all of a PS discovery process and a non-PS discovery process in a wireless communication system supporting a D2D scheme.

An embodiment of the present disclosure proposes an apparatus and method for transmitting and receiving a D2D discovery message thereby decreasing power consumption in a wireless communication system supporting a D2D scheme.

An embodiment of the present disclosure proposes an apparatus and method for transmitting and receiving a D2D discovery message thereby identifying a PS discovery message and a non-PS discovery message in a wireless communication system supporting a D2D scheme.

An embodiment of the present disclosure proposes an apparatus and method for transmitting and receiving a D2D discovery message by considering a network coverage in a wireless communication system supporting a D2D scheme.

An embodiment of the present disclosure proposes an apparatus and method for transmitting and receiving a D2D discovery message thereby decreasing interference due to transmission of a D2D discovery message in a wireless communication system supporting a D2D scheme.

In accordance with an aspect of the present disclosure, an operating method of an evolved node B (eNB) in a wireless communication system supporting a device to device (D2D) scheme is provided. The operating method includes transmitting at least one of first type-discovery resource pool information as information on at least one first type-discovery resource pool including a plurality of first type-discovery resources and second type-discovery resource pool information as information on at least one second type-discovery resource pool including a plurality of second type-discovery resources, or transmitting discovery resource information on at least one discovery resource which corresponds to a discovery resource type requested from a user equipment (UE), wherein a first type-discovery resource denotes a resource used for performing a first discovery process for a first type-service, wherein a second type-discovery resource denotes a resource used for performing a second discovery process different from the first discovery process, and wherein the at least one discovery resource which corresponds to the discovery resource type requested from the UE includes at least one of the first type-discovery resources and the second type-discovery resources.

In accordance with another aspect of the present disclosure, an operating method of a user equipment (UE) in a wireless communication system supporting a device to device (D2D) scheme is provided. The operating method includes receiving at least one of first type-discovery resource pool information as information on at least one first type-discovery resource pool including a plurality of first type-discovery resources and second type-discovery resource pool information as information on at least one second type-discovery resource pool including a plurality of second type-discovery resources, or receiving discovery resource information on at least one discovery resource which corresponds to a discovery resource type requested from the UE, wherein a first type-discovery resource denotes a resource used for performing a first discovery process for a first type-service, wherein a second type-discovery resource denotes a resource used for performing a second discovery process different from the first discovery process, and wherein the at least one discovery resource which corresponds to the discovery resource type requested from the UE includes at least one of the first type-discovery resources and the second type-discovery resources.

In accordance with another aspect of the present disclosure, an evolved node B (eNB) in a wireless communication system supporting a device to device (D2D) scheme is provided. The eNB includes a processor configured to transmit at least one of first type-discovery resource pool information as information on at least one first type-discovery resource pool including a plurality of first type-discovery resources and second type-discovery resource pool information as information on at least one second type-discovery resource pool including a plurality of second type-discovery resources, or transmit discovery resource information on at least one discovery resource which corresponds to a discovery resource type requested from a user equipment (UE), wherein a first type-discovery resource denotes a resource used for performing a first discovery process for a first type-service, wherein a second type-discovery resource denotes a resource used for performing a second discovery process different from the first discovery process, and wherein the at least one discovery resource which corresponds to the discovery resource type requested from the UE includes at least one of the first type-discovery resources and the second type-discovery resources.

In accordance with another aspect of the present disclosure, a user equipment (UE) in a wireless communication system supporting a device to device (D2D) scheme is provided. The UE includes a processor configured to receive at least one of first type-discovery resource pool information as information on at least one first type-discovery resource pool including a plurality of first type-discovery resources and second type-discovery resource pool information as information on at least one second type-discovery resource pool including a plurality of second type-discovery resources, or receive discovery resource information on at least one discovery resource which corresponds to a discovery resource type requested from the UE, wherein a first type-discovery resource denotes a resource used for performing a first discovery process for a first type-service, wherein a second type-discovery resource denotes a resource used for performing a second discovery process different from the first discovery process, and wherein the at least one discovery resource which corresponds to the discovery resource type requested from the UE includes at least one of the first type-discovery resources and the second type-discovery resources.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
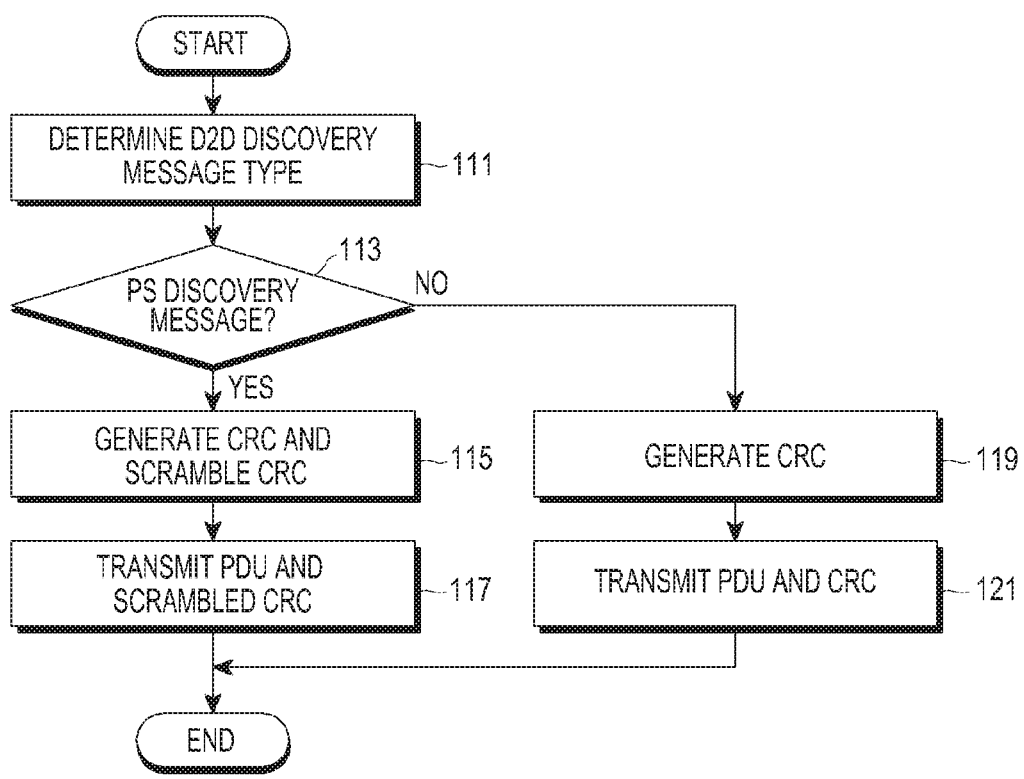
FIG. 1 schematically illustrates an example of a process for transmitting a D2D discovery message in a D2D UE in a wireless communication system supporting a D2D scheme according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/ or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a signal receiving apparatus may be a user equipment (UE), and a signal transmitting apparatus may be a base station. The term UE may be interchangeable with the term mobile station (MS), wireless terminal, mobile device, and the like. The term base station may be interchangeable with the term node B, evolved node B (eNB), evolved universal terrestrial radio access network (E-UTRAN) node B (eNB), access point (AP), and the like.

An embodiment of the present disclosure proposes an apparatus and method for transmitting and receiving a device to device (D2D) discovery message in a wireless communication system supporting a D2D scheme.

An embodiment of the present disclosure proposes an apparatus and method for transmitting and receiving a D2D discovery message by considering all of a public safety (PS) discovery process and a non-PS discovery process in a wireless communication system supporting a D2D scheme. Here, a PS discovery process denotes a discovery process for a PS service, and a non-PS discovery process denotes a discovery process which is not the PS discovery process.

*63An embodiment of the present disclosure proposes an apparatus and method for transmitting and receiving a D2D discovery message thereby decreasing power consumption in a wireless communication system supporting a D2D scheme.

An embodiment of the present disclosure proposes an apparatus and method for transmitting and receiving a D2D discovery message thereby identifying a PS discovery message and a non-PS discovery message in a wireless communication system supporting a D2D scheme. Here, a PS discovery message denotes a D2D discovery message used for a PS discovery process and a non-PS discovery message denotes a D2D discovery message used for a non-PS discovery process.

An embodiment of the present disclosure proposes an apparatus and method for transmitting and receiving a D2D discovery message by considering a network coverage in a wireless communication system supporting a D2D scheme.

An embodiment of the present disclosure proposes an apparatus and method for transmitting and receiving a D2D discovery message thereby decreasing interference due to transmission of a D2D discovery message in a wireless communication system supporting a D2D scheme.

An apparatus and method proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVP-H), an advanced television systems committee-mobile/handheld (ATSC-M/ H) service, and the like, and an internet protocol television (IPTV), a moving picture experts group (MPEG) media transport (MMT) system and/or the like.

In a D2D scheme, a D2D UE transmits a D2D discovery message using a time resource and a frequency resource, e.g., a discovery resource, which are configured by an eNB which manages a serving cell of the D2D UE in order to perform a discovery operation. Here, a D2D UE denotes a UE which supports a D2D scheme.

A discovery resource may be classified into a type 1-discovery resource and a type 2-discovery resource, and each of the type 1-discovery resource and the type 2-discovery resource will be described below.

Firstly, a type 1-discovery resource will be described below.

The type 1-discovery resource denotes a resource that one or more contention based-pools are configured and signaled using broadcast and unicast signaling.

Secondly, a type 2-discovery resource will be described below.

The type 2-discovery resource denotes a resource that dedicated resources are assigned to a D2D UE for transmitting a D2D discovery message.

A D2D UE interested in transmitting a D2D discovery message reads a system information block 19 (SIB19) broadcasted in a serving cell.

If the SIB19 is not broadcasted in the serving cell, the D2D UE does not transmit a D2D discovery message.

Alternatively, if the SIB19 is broadcasted in the serving cell, information on a transmission (TX) resource pool for transmitting a D2D discovery message, i.e., TX resource pool information is included in the SIB19, and the D2D UE is in an idle state, the D2D UE selects a discovery resource from a TX resource pool which corresponds to the TX resource pool information, and transmits the D2D discovery message through the selected discovery resource.

Alternatively, if the SIB19 is broadcasted in the serving cell, the TX resource pool information for transmitting the D2D discovery message is not included in the SIB19, and the D2D UE is in the idle state, the D2D UE transitions from the idle state into a connected state, and requests a dedicated resource from an eNB which manages the serving cell.

Alternatively, if the SIB19 is broadcasted in the serving cell, and the D2D UE is in the connected state, the D2D UE requests resources for transmitting the D2D discovery message.

In a wireless communication system supporting a D2D scheme according to an embodiment of the present disclosure, each of a discovery resource used for a UE which is within a network coverage to transmit a D2D discovery message and a discovery resource used for a UE which is out of the network coverage to transmit a D2D discovery message will be described below.

In a wireless communication system supporting a D2D scheme according to an embodiment of the present disclosure, a discovery resource used for a UE which is within a network coverage to transmit a D2D discovery message and a discovery resource used for a UE which is out of the network coverage to transmit a D2D discovery message are separated in a time domain. That is, an embodiment of the present disclosure proposes a scheme that a discovery resource used for a UE which is within a network coverage to transmit a D2D discovery message and a discovery resource used for a UE which is out of the network coverage to transmit a D2D discovery message are not separated based on a frequency division multiplexing (FDM) scheme.

So, in an embodiment of the present disclosure, a transmission (TX) resource pool including TX resources used for a UE which is within a network coverage to transmit a D2D discovery message and a TX resource pool including TX resources used for a UE which is out of a network coverage to transmit a D2D discovery message are not overlapped. For convenience, a TX resource pool including TX resources used for a UE which is within a network coverage to transmit a D2D discovery message will be referred to as "inner-TX resource pool", and a TX resource pool including TX resources used for a UE which is out of a network coverage to transmit a D2D discovery message will be referred to as "outer-TX resource pool".

The inner-TX resource pool is configured by an eNB. The eNB detects an outer-TX resource pool, and configures the inner-TX resource pool thereby the outer-TX resource pool is not overlapped with the inner-TX resource pool.

A discovery resource used for a UE which is within a network coverage to transmit a D2D discovery message and a discovery resource used for a UE which is out of a network coverage to transmit a D2D discovery message in a wireless communication system supporting a D2D scheme according to an embodiment of the present disclosure have been described above, and each of a scheme for transmitting a D2D discovery message and a scheme for receiving a D2D discovery message in a wireless communication system supporting a D2D scheme according to an embodiment of the present disclosure will be described below.

An example of a process for transmitting a D2D discovery message in a D2D UE in a wireless communication system supporting a D2D scheme according to an embodiment of the present disclosure will be described with reference to FIG. 1.

FIG. 1 schematically illustrates an example of a process for transmitting a D2D discovery message in a D2D UE in a wireless communication system supporting a D2D scheme according to an embodiment of the present disclosure.

Referring to FIG. 1, a D2D UE, i.e., a transmitting apparatus determines a type of a D2D discovery message which will be transmitted by the D2D UE at operation 111. Here, a type of a D2D discovery message may be classified into two types, e.g., a PS type and a non-PS type. A D2D discovery message with a PS type is a PS discovery message, and a non-PS D2D discovery message with a non-PS type is a non-PS discovery message. There may be a plurality of D2D discovery messages, and a type (PS or non-PS) of each D2D discovery message may be predefined in the wireless communication system. Any UE may transmit the plurality of D2D discovery messages. For example, a type of a D2D discovery message is a PS type if the D2D discovery message is transmitted by a PS UE, and a type of the D2D discovery message is a non-PS type if the D2D discovery message is transmitted by a non-PS UE. For convenience, the term a type of a D2D discovery message will be interchangeable with the term a D2D discovery message type.

The D2D UE determines whether the D2D discovery message is a PS discovery message at operation 113. If the D2D discovery message is the PS discovery message, the D2D UE generates a cyclic redundancy check (CRC) for a protocol data unit (PDU) carrying the PS discovery message and scrambles the CRC using a predetermined CRC mask at operation 115.

The D2D UE transmits the PDU and the scrambled CRC using a discovery resource acquired for transmitting the PS discovery message at operation 117. The scrambled CRC may be generated by performing an exclusive OR (XOR) operation among bits included in the CRC mask and bits included in the CRC, and a detailed description thereof will be omitted herein.

If the D2D discovery message is not the PS discovery message, that is, if the D2D discovery message is a non-PS discovery message, the D2D UE generates a CRS for a PDU carrying the non-PS discovery message at operation 119. If the D2D discovery message is the non-PS discovery message, the D2D UE does not scramble the CRC using the predetermined CRC mask.

The D2D UE transmits the PDU and the unscrambled CRC using a discovery resource acquired for transmitting the non-PS discovery message at operation 121.

In FIG. 1, in a case that a D2D UE transmits only a specific type of D2D discovery message, it will be noted that the D2D UE may not determine a type of a D2D discovery message.

Although FIG. 1 illustrates an example of a process for transmitting a D2D discovery message in a D2D UE in a wireless communication system supporting a D2D scheme according to an embodiment of the present disclosure, various changes could be made to FIG. 1. For example, although shown as a series of operations, various operations in FIG. 1 could overlap, occur in parallel, occur in a different order, or occur multiple times.

An example of a process for transmitting a D2D discovery message in a D2D UE in a wireless communication system supporting a D2D scheme according to an embodiment of the present disclosure has been described with reference to FIG. 1, and an example of a process for receiving a D2D discovery message in a D2D UE in a wireless communication system supporting a D2D scheme according to an embodiment of the present disclosure will be described with reference to FIG. 2.

Figure 2:
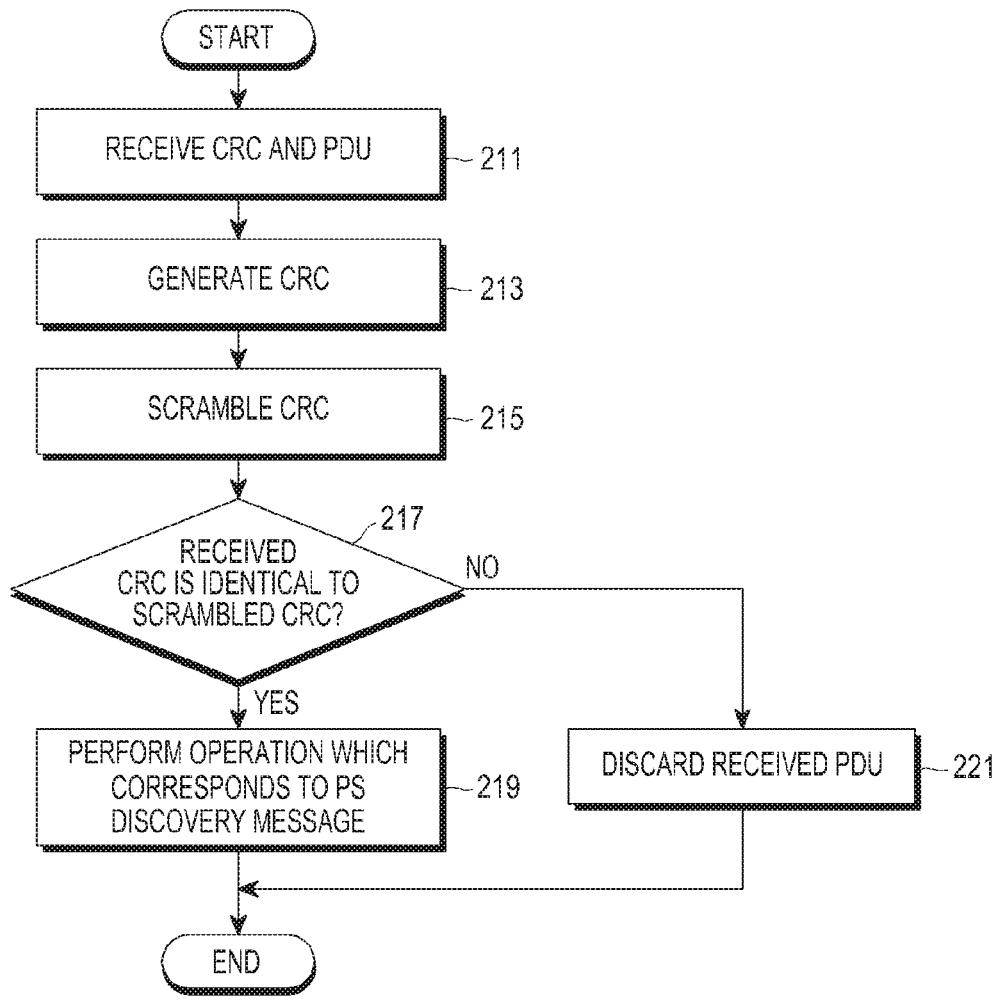
FIG. 2 schematically illustrates an example of a process for receiving a D2D discovery message in a D2D UE in a wireless communication system supporting a D2D scheme according to an embodiment of the present disclosure.

FIG. 2 schematically illustrates an example of a process for receiving a D2D discovery message in a D2D UE in a wireless communication system supporting a D2D scheme according to an embodiment of the present disclosure.

Referring to FIG. 2, it will be noted that a process for receiving a D2D discovery message in FIG. 2 is a process that a D2D UE, i.e., a receiving apparatus, interested in receiving only a PS discovery message receives a D2D discovery message.

A D2D UE receives a CRC and a PDU through a reception (RX) resource acquired for receiving a D2D discovery message at operation 211. The D2D UE generates a CRC for a PDU carrying a D2D discovery message at operation 213. The D2D UE scrambles the generated CRC using a predefined CRC mask at operation 215. The D2D UE determines whether the received CRC is identical to the scrambled CRC at operation 217.

If the received CRC is identical to the scrambled CRC, the D2D UE performs an operation which corresponds to a PS discovery message since a D2D discovery message carried through the received PDU is the PS discovery message at operation 219.

If the received CRC is not identical to the scrambled CRC, the D2D UE discards the received PDU since a PS discovery message is not carried through the received PDU at operation 221.

Although FIG. 2 illustrates an example of a process for receiving a D2D discovery message in a D2D UE in a wireless communication system supporting a D2D scheme according to an embodiment of the present disclosure, various changes could be made to FIG. 2. For example, although shown as a series of operations, various operations in FIG. 2 could overlap, occur in parallel, occur in a different order, or occur multiple times.

An example of a process for receiving a D2D discovery message in a D2D UE in a wireless communication system supporting a D2D scheme according to an embodiment of the present disclosure has been described with reference to FIG. 2, and another example of a process for receiving a D2D discovery message in a D2D UE in a wireless communication system supporting a D2D scheme according to an embodiment of the present disclosure will be described with reference to FIG. 3.

Figure 3:
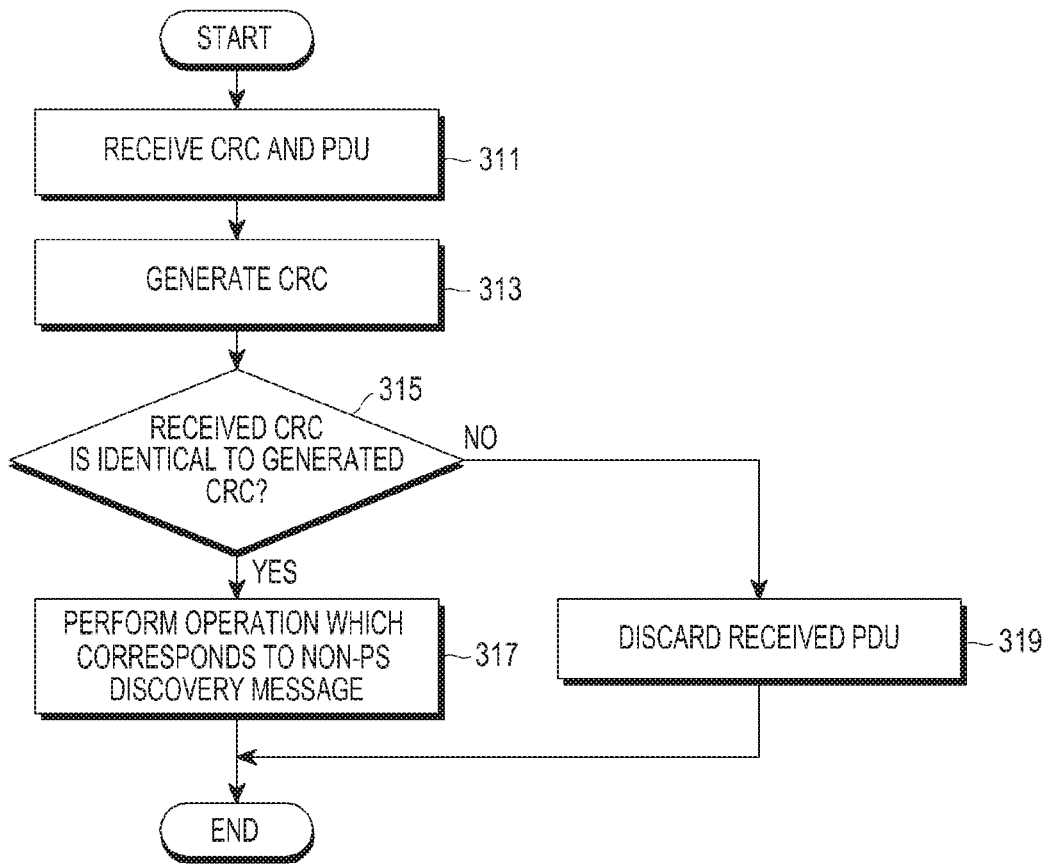
FIG. 3 schematically illustrates another example of a process for receiving a D2D discovery message in a D2D UE in a wireless communication system supporting a D2D scheme according to an embodiment of the present disclosure.

FIG. 3 schematically illustrates another example of a process for receiving a D2D discovery message in a D2D UE in a wireless communication system supporting a D2D scheme according to an embodiment of the present disclosure.

Referring to FIG. 3, it will be noted that a process for receiving a D2D discovery message in FIG. 3 is a process that a D2D UE, i.e., a receiving apparatus, interested in receiving only a non-PS discovery message receives a D2D discovery message.

A D2D UE receives a CRC and a PDU through an RX resource acquired for receiving a D2D discovery message at operation 311. The D2D UE generates a CRC for a PDU carrying a D2D discovery message at operation 313. The D2D UE determines whether the received CRC is identical to the generated CRC at operation 315.

If the received CRC is identical to the generated CRC, the D2D UE performs an operation which corresponds to a non-PS discovery message since a D2D discovery message carried through the received PDU is the non-PS discovery message at operation 317.

If the received CRC is not identical to the generated CRC, the D2D UE discards the received PDU since a non-PS discovery message is not carried through the received PDU at operation 319.

Although FIG. 3 illustrates another example of a process for receiving a D2D discovery message in a D2D UE in a wireless communication system supporting a D2D scheme according to an embodiment of the present disclosure, various changes could be made to FIG. 3. For example, although shown as a series of operations, various operations in FIG. 3 could overlap, occur in parallel, occur in a different order, or occur multiple times.

Another example of a process for receiving a D2D discovery message in a D2D UE in a wireless communication system supporting a D2D scheme according to an embodiment of the present disclosure has been described with reference to FIG. 3, and still another example of a process for receiving a D2D discovery message in a D2D UE in a wireless communication system supporting a D2D scheme according to an embodiment of the present disclosure will be described with reference to FIG. 4.

Figure 4:
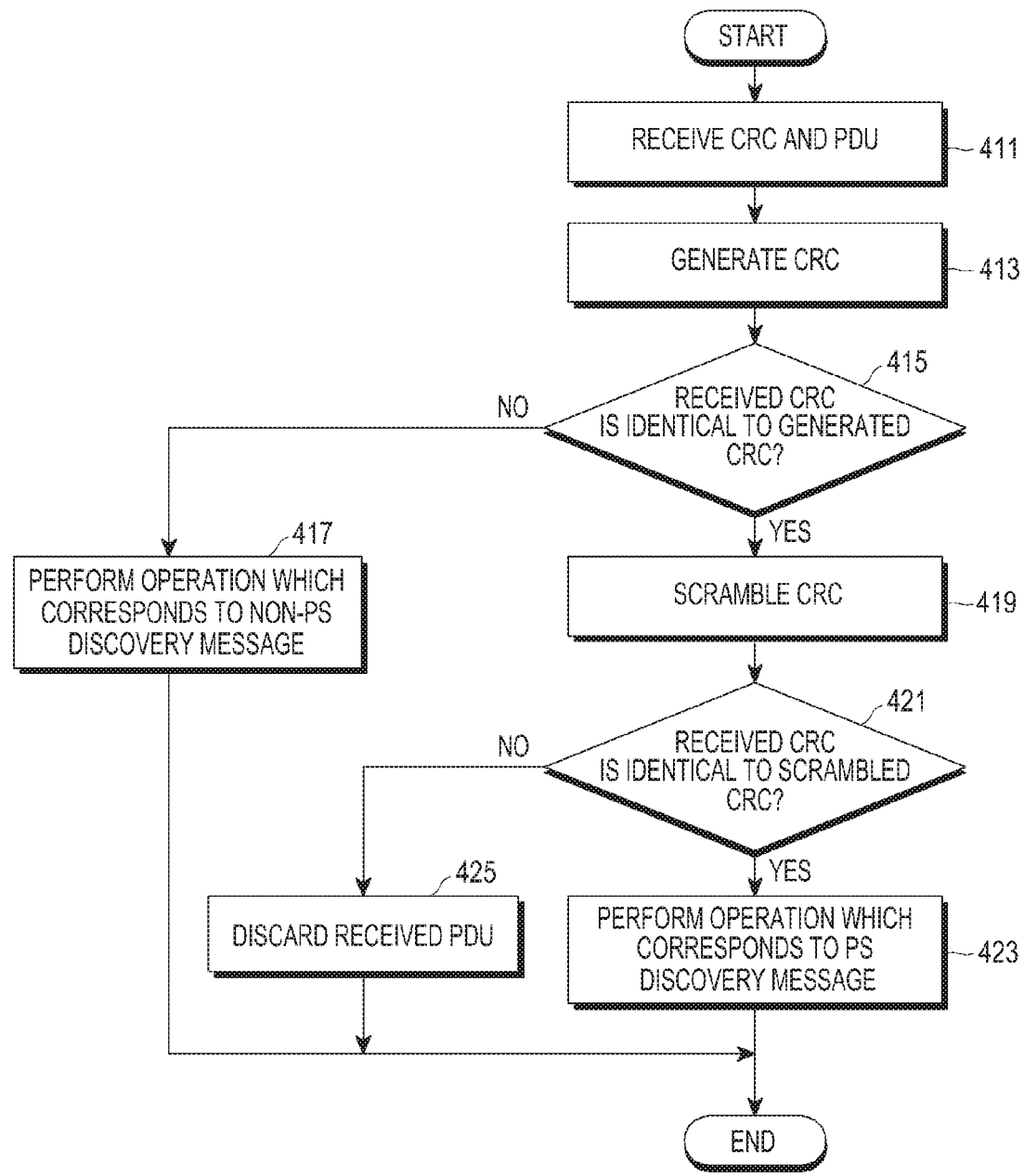
FIG. 4 schematically illustrates still another example of a process for receiving a D2D discovery message in a D2D UE in a wireless communication system supporting a D2D scheme according to an embodiment of the present disclosure.

FIG. 4 schematically illustrates still another example of a process for receiving a D2D discovery message in a D2D UE in a wireless communication system supporting a D2D scheme according to an embodiment of the present disclosure.

Referring to FIG. 4, it will be noted that a process for receiving a D2D discovery message in FIG. 4 is a process that a D2D UE, i.e., a receiving apparatus, interested in receiving both a PS discovery message and a non-PS discovery message receives a D2D discovery message.

A D2D UE receives a CRC and a PDU through an RX resource acquired for receiving a D2D discovery message at operation 411. The D2D UE generates a CRC for a PDU carrying a D2D discovery message at operation 413. The D2D UE determines whether the received CRC is identical to the generated CRC at operation 415.

If the received CRC is identical to the generated CRC, the D2D UE performs an operation which corresponds to a non-PS discovery message since a D2D discovery message carried through the received PDU is the non-PS discovery message at operation 417.

If the received CRC is not identical to the generated CRC, the D2D UE scrambles the generated CRC using a pre-defined CRC mask at operation 419. The D2D UE determines whether the received CRC is identical to the scrambled CRC at operation 421.

If the received CRC is identical to the scrambled CRC, the D2D UE performs an operation which corresponds to a PS discovery message since a D2D discovery message carried through the received PDU is the PS discovery message at operation 423.

If the received CRC is not identical to the scrambled CRC, the D2D UE discards the received PDU since a PS discovery message is not carried through the received PDU at operation 425.

As described in FIGS. 1 to 4, it will be understood that an embodiment of the present disclosure may differentiate a PS discovery message and a non-PS discovery message based on CRC masking.

Alternatively, an embodiment of the present disclosure may differentiate a PS discovery message and a non-PS discovery message based on a resource, this will be described below.

Another example of a process for transmitting a D2D discovery message in a D2D UE in a wireless communication system supporting a D2D scheme according to an embodiment of the present disclosure will be described with reference to FIG. 5.

Figure 5:
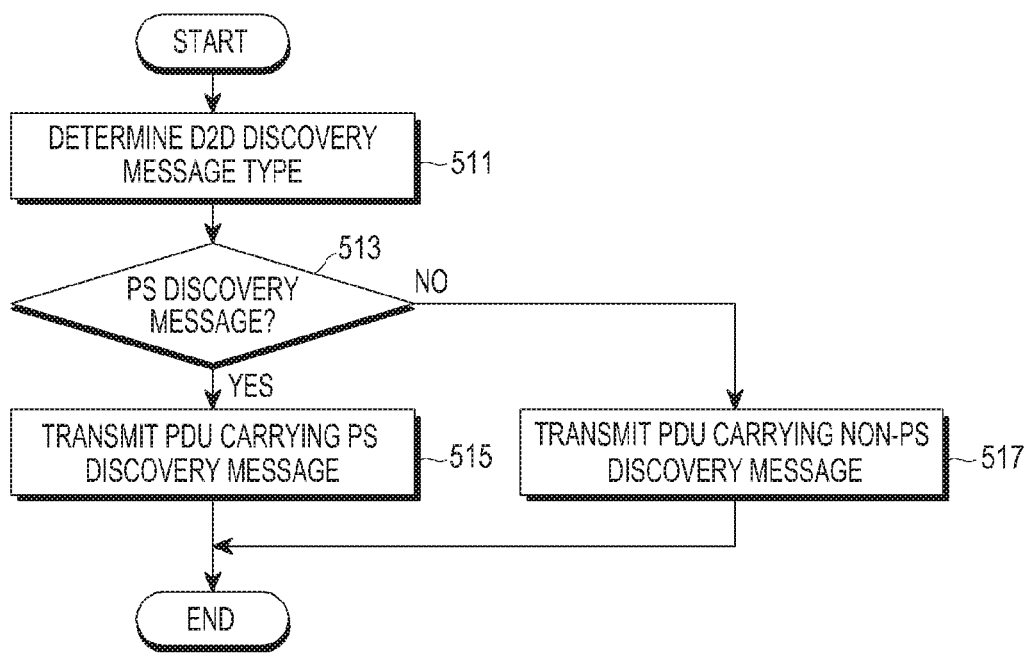
FIG. 5 schematically illustrates another example of a process for transmitting a D2D discovery message in a D2D UE in a wireless communication system supporting a D2D scheme according to an embodiment of the present disclosure.

FIG. 5 schematically illustrates another example of a process for transmitting a D2D discovery message in a D2D UE in a wireless communication system supporting a D2D scheme according to an embodiment of the present disclosure.

Referring to FIG. 5, operations 511 and 513 in FIG. 5 are similar to operations 111 and 113 in FIG. 1, so a detailed description thereof will be omitted herein.

According to a result at operation 513, if a D2D discovery message which will be transmitted by a D2D UE, i.e., a transmitting apparatus, is a PS discovery message, the D2D UE transmits a PDU carrying the PS discovery message using a PS discovery resource at operation 515. Here, a PS discovery resource denotes a resource used for transmitting a PS discovery message, so only a PS discovery message may be transmitted through a PS discovery resource.

According to the result at operation 513, if the D2D discovery message which will be transmitted by the D2D UE is a non-PS discovery message, the D2D UE transmits a PDU carrying the non-PS discovery message using a non-PS discovery resource at operation 517. Here, a non-PS discovery resource denotes a resource used for transmitting a non-PS discovery message, so only a non-PS discovery message may be transmitted through a non-PS discovery resource.

In this case, a D2D UE determines a type of a D2D discovery message, and transmits a PDU carrying a PS discovery message using a PS discovery resource if the type of the D2D discovery message is a PS type. If the type of the D2D discovery message is not the PS type, the D2D UE transmits a PDU carrying a non-PS discovery message using a non-PS discovery resource. There may be a plurality of D2D discovery messages and a type (PS or non-PS) of each D2D discovery message may be predefined in the wireless communication system. In FIG. 5, in a case that a D2D UE transmits only a specific type of D2D discovery message, it will be noted that the D2D UE may not determine a type of a D2D discovery message.

Another example of a process for transmitting a D2D discovery message in a D2D UE in a wireless communication system supporting a D2D scheme according to an embodiment of the present disclosure has been described with reference to FIG. 5, and an example of a process for transmitting and receiving resource allocation information in a wireless communication system supporting a D2D scheme according to an embodiment of the present disclosure will be described with reference to FIG. 6.

Figure 6:
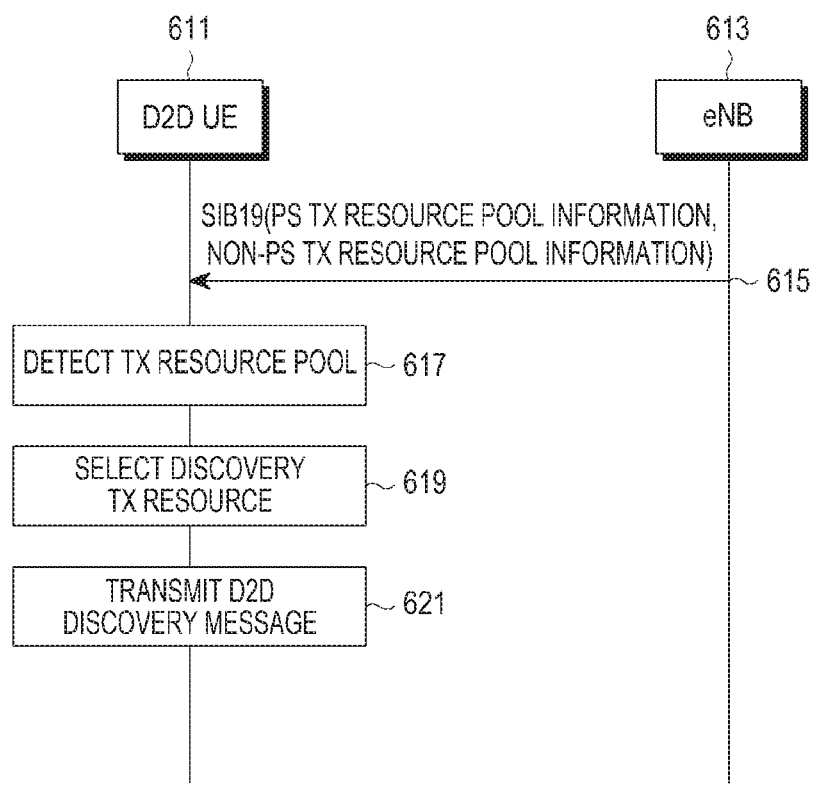
FIG. 6 schematically illustrates an example of a process for transmitting and receiving resource allocation information in a wireless communication system supporting a D2D scheme according to an embodiment of the present disclosure.

FIG. 6 schematically illustrates an example of a process for transmitting and receiving resource allocation information in a wireless communication system supporting a D2D scheme according to an embodiment of the present disclosure.

Referring to FIG. 6, an eNB 613 manages one or more PS TX resource pool(s) and one or more non-PS TX resource pool(s). Here, a PS TX resource pool includes at least one PS TX resource, and a PS TX resource denotes a resource used for transmitting a PS discovery message. A non-PS TX resource pool includes at least one non-PS TX resource, and a non-PS TX resource denotes a resource used for transmitting a non-PS discovery message. The eNB 613 may configure one or more PS TX resource pool(s) and one or more non-PS TX resource pool(s) based on various parameters for the wireless communication system, and a detailed description for a scheme for configuring the PS TX resource pool and the non-PS TX resource pool will be omitted herein. The eNB 613 broadcasts information on one or more PS TX resource pool(s), i.e., PS TX resource pool information and information on one or more non-PS TX resource pool(s), i.e., non-PS TX resource pool information through a broadcast message, e.g., an SIB at operation 615. The SIB19 including the PS TX resource pool information and the non-PS TX resource pool information will be described below, so a detailed description thereof will be omitted herein. In one embodiment, an eNB may broadcast either information on a PS TX resource pool(s) or a non-PS TX resource pool(s). The non-PS TX resource pool configured through a broadcast message at operation 615 indicates resources by which a D2D UE is allowed to transmit a non-PS discovery messages while the D2D UE is in a radio resource control idle (RRC_IDLE) state. The PS TX resource pool configured through the broadcast message at operation 615 indicates resources by which a D2D UE is allowed to transmit a PS discovery messages while the D2D UE is in an RRC_IDLE state.

Meanwhile, a D2D UE 611 reads an SIB19 broadcasted by the eNB 613. The D2D UE 611 may receive one or more PS TX resource pool(s) and/or one or more non-PS TX resource pool(s) based on the PS TX resource pool information and/or the non-PS TX resource pool information included in the SIB19 at operation 615. At operation 617, the D2D UE 611 selects one of a PS TX Resource pool(s) or a non-PS TX resource pool(s) for transmitting a D2D discovery message. If the D2D discovery message to be transmitted is a PS discovery message, the D2D UE 611 selects a PS TX resource pool. In a case that information on a plurality of PS TX resource pools is received by the D2D UE 611 at operation 615, the D2D UE 611 first selects a PS TX resource pool randomly or based on reference signal received power (RSRP) of a link between the D2D UE 611 and the eNB 613 from the plurality of PS TX resource pools. If the D2D discovery message to be transmitted is a non-PS discovery message, the D2D UE 611 selects non-PS TX resource pool. In a case that information on a plurality of non-PS TX resource pools is received by the D2D UE 611 at operation 615, the D2D UE 611 first selects a non-PS TX resource pool randomly or based on RSRP of a link between the D2D UE 611 and the eNB 613 from the plurality of non-PS TX resource pools.

The D2D UE 611 selects a discovery TX resource through which a D2D discovery message will be transmitted from the selected TX resource pool at operation 619, and transmits the D2D discovery message using the selected discovery TX resource at operation 621. This will be described below.

If the D2D discovery message to be transmitted by the D2D UE 611 is a PS discovery message, the D2D UE 611 transmits the PS discovery message using a PS TX resource included in a PS TX resource pool.

If the D2D discovery message to be transmitted by the D2D UE 611 is a non-PS discovery message, the D2D UE 611 transmits the non-PS discovery message using a non-PS TX resource included in a non-PS TX resource pool.

In an embodiment of the present disclosure, if a size of a PS discovery message is different from a size of a non-PS discovery message, the number of physical resource blocks (PRBs) selected from a TX resource pool may be different. For example, the D2D UE 611 selects X PRBs from the PS TX resource pool, and transmits a PS discovery message using the selected X PRBs. For another example, the D2D UE 611 selects Y PRBs from the non-PS TX resource pool, and transmits a non-PS discovery message using the selected Y PRBs.

In an embodiment of the present disclosure, a discovery period which is based on a PS TX resource pool may be different from a discovery period which is based on a non-PS TX resource pool. For example, the discovery period which is based on the PS TX resource pool may be shorter than the discovery period which is based on the non-PS TX resource pool.

Meanwhile, an SIB19 including PS TX resource pool information and non-PS TX resource pool information proposed in a wireless communication system supporting a D2D scheme according to an embodiment of the present disclosure will be described below.

Firstly, in an embodiment of the present disclosure, PS TX resource pool information and non-PS TX resource pool information may be indicated using a parameter SL-DiscTxPoolList-r12 and a parameter SL-DiscResourcePool-r12 included in an SIB19 as expressed in Table 1.

TABLE 1

SystemInformationBlockType19-r12 ::= SEQUENCE {
   discConfig-r12                           SEQUENCE {
      discTxPoolCommon-r12          SL-DiscTxPoolList-r12
   }
}
SL-DiscTxPoolList-r12 ::=     SEQUENCE (SIZE (1..maxSL-TxPool-r12)) OF SL-DiscResourcePool-r12
SL-DiscResourcePool-r12 ::=  SEQUENCE {
  PS Indicator,
}

In Table 1, the parameter SL-DiscTxPoolList-r12 indicates non-PS TX resource pool information, and the parameter SL-DiscResourcePool-r12 indicates PS TX resource pool information. The parameter SL-DiscResourcePool-r12 includes a PS indicator.

Secondly, in an embodiment of the present disclosure, PS TX resource pool information and non-PS TX resource pool information may be indicated using a parameter discTxPoolCommon-r12 and a parameter discTxPoolCommonPS-r12 included in an SIB19 as expressed in Table 2.

TABLE 2

SystemInformationBlockType19-r12 ::= SEQUENCE {
   discConfig-r12                           SEQUENCE {
      discTxPoolCommon-r12          SL-DiscTxPoolList-r12
      discTxPoolCommonPS-r12       SL-DiscTxPoolList-r12
   }
}

In Table 2, the parameter discTxPoolCommon-r12 indicates non-PS TX resource pool information, and the parameter discTxPoolCommonPS-r12 indicates PS TX resource pool information.

Another example of a process for transmitting and receiving resource allocation information in a wireless communication system supporting a D2D scheme according to an embodiment of the present disclosure will be described with reference to FIG. 7.

Figure 7:
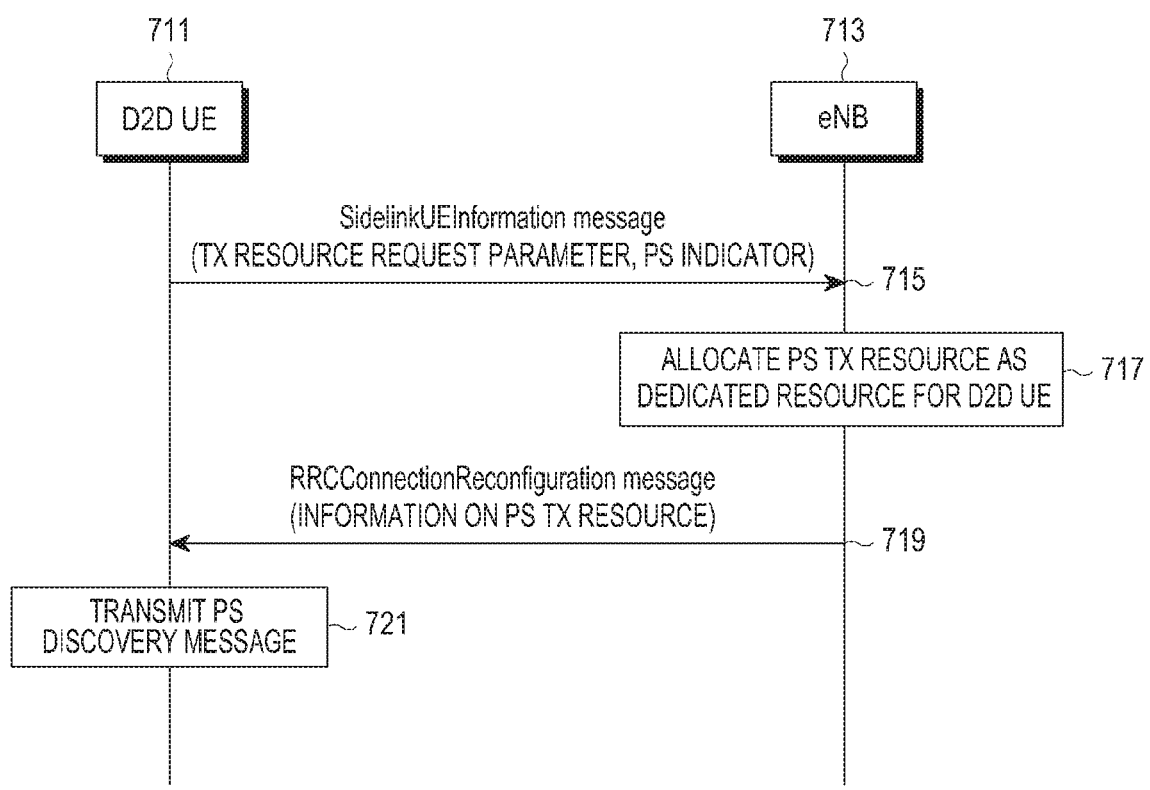
FIG. 7 schematically illustrates another example of a process for transmitting and receiving resource allocation information in a wireless communication system supporting a D2D scheme according to an embodiment of the present disclosure.

FIG. 7 schematically illustrates another example of a process for transmitting and receiving resource allocation information in a wireless communication system supporting a D2D scheme according to an embodiment of the present disclosure.

Referring to FIG. 7, a D2D UE 711 detects a need for transmitting a PS discovery message. The D2D UE 711 requests a PS TX resource for transmitting a PS discovery message from the eNB 713 by transmitting a message, e.g., a SidelinkUEInformation message. The SidelinkUEInformation message includes a TX Resource Request parameter indicating that a discovery TX resource is requested, and a PS indicator indicating that a TX resource for transmitting a PS discovery message is required. Alternately, the SidelinkUEInformation message includes a PS Discovery TX Resource Request parameter indicating that a PS discovery TX resource is requested.

The SidelinkUEInformation message includes the number of PS D2D discovery messages which will be transmitted by the D2D UE 711 in each discovery period. The D2D UE 711 may also include information about frequency on which the D2D UE 711 wants to transmit the PS D2D discovery messages.

The eNB 713 manages a TX resource pool for a PS discovery process, i.e., a PS TX resource pool and a TX resource pool for a non-PS discovery process, i.e., a non-PS TX resource pool. So, upon receiving the SidelinkUEInformation message from the D2D UE 711, the eNB 713 allocates a PS TX resource included in the PS TX resource pool as a dedicated resource for the D2D UE 711 at operation 717, and transmits information on the PS TX resource allocated to the D2D UE 711 through a message, e.g., a radio resource control (RRC) connection reconfiguration (RRCConnectionReconfiguration) message at operation 719.

After receiving the RRCConnectionReconfiguration message from the eNB 713, the D2D UE 711 obtains the PS TX resource allocated to the D2D UE 711 based on information on the PS TX resource allocated to the D2D UE 711 included in the RRCConnectionReconfiguration message, and transmits a PS discovery message using the allocated PS TX resource at operation 721.

Alternately, the eNB 713 transmits one or more PS TX resource pool(s) to the D2D UE 711 at operation 717 for transmitting PS discovery messages. In a case that a plurality of PS TX resource pools are indicated, the D2D UE 711 first selects a PS TX resource pool randomly or based on RSRP of a link between the D2D UE 711 and the eNB 713. From the selected PS TX resource pool, the D2D UE 711 selects the resources for transmitting PS discovery message randomly.

Meanwhile, if a discovery period for a PS discovery process is different from a discovery period for a non-PS discovery process, the eNB 713 includes the discovery period for the PS discovery process into the RRCConnectionReconfiguration message. Alternatively, the eNB 713 may include the discovery period for the PS discovery process into broadcast signaling, not the RRCConnectionReconfiguration message.

Another example of a process for transmitting and receiving resource allocation information in a wireless communication system supporting a D2D scheme according to an embodiment of the present disclosure has been described with reference to FIG. 7, and still another example of a process for transmitting and receiving resource allocation information in a wireless communication system supporting a D2D scheme according to an embodiment of the present disclosure will be described with reference to FIG. 8.

Figure 8:
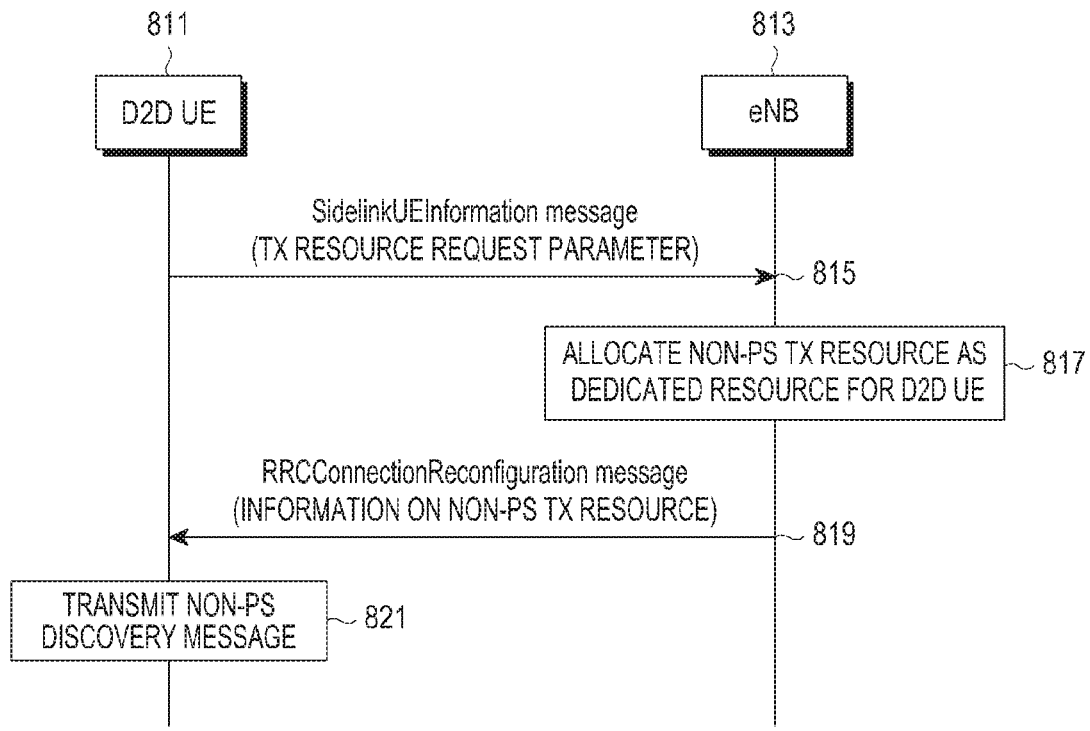
FIG. 8 schematically illustrates still another example of a process for transmitting and receiving resource allocation information in a wireless communication system supporting a D2D scheme according to an embodiment of the present disclosure.

FIG. 8 schematically illustrates still another example of a process for transmitting and receiving resource allocation information in a wireless communication system supporting a D2D scheme according to an embodiment of the present disclosure.

Referring to FIG. 8, a D2D UE 811 detects a need for transmitting a non-PS discovery message. The D2D UE 811 requests a PS TX resource for transmitting a non-PS discovery message from an eNB 813 by transmitting a message, e.g., a SidelinkUEInformation message, to the eNB 813 at operation 815. The SidelinkUEInformation message includes a parameter TX Resource Request indicating that the D2D UE 811 requests a TX resource. Here, the D2D UE 811 does not include a PS indicator indicating that TX resources for transmitting a PS discovery message are required since the D2D UE 811 transmits a non-PS discovery message.

The SidelinkUEInformation message includes the number of non-PS D2D discovery messages which will be transmitted by the D2D UE 811 in each discovery period. The D2D UE 811 may also include information about frequency on which the D2D UE 811 wants to transmit the PS D2D discovery messages.

The eNB 813 manages a TX resource pool for a PS discovery process, i.e., a PS TX resource pool and a TX resource pool for a non-PS discovery process, i.e., a non-PS TX resource pool. So, upon receiving the SidelinkUEInformation message from the D2D UE 811, the eNB 813 allocates a non-PS TX resource included in the non-PS TX resource pool as a dedicated resource for the D2D UE 811 at operation 817, and transmits information on the non-PS TX resource allocated to the D2D UE 811 through a message, e.g., an RRCConnectionReconfiguration message at operation 819.

After receiving the RRCConnectionReconfiguration message from the eNB 813, the D2D UE 811 obtains the non-PS TX resource allocated to the D2D UE 811 based on information on the non-PS TX resource allocated to the D2D UE 811 included in the RRCConnectionReconfiguration message, and transmits a non-PS discovery message using the allocated non-PS TX resource at operation 821.

Alternately, the eNB 813 transmits one or more non-PS TX resource pool(s) to the D2D UE 811 at operation 817 for transmitting non-PS discovery messages. In a case that a plurality of non-PS TX resource pools are indicated, the D2D UE 811 first selects a non-PS TX resource pool randomly or based on RSRP of a link between the D2D UE 811 and the eNB 813. From the selected non-PS TX resource pool, the D2D UE 811 selects the resources for transmitting a non-PS discovery message randomly.

*156In another embodiment, if a D2D UE needs to transmit both a PS discovery message and a non-discovery message, the D2D UE includes both a parameter PS Discovery TX request and a parameter non-PS Discovery TX request into a SidelinkUEInformation message. The non-PS Discovery Resource Request includes the number of non-PS discovery messages that a D2D UE wants to transmit in each discovery period. The PS Discovery Resource Request includes the number of PS discovery messages that a D2D UE wants to transmit in each discovery period. Still another example of a process for transmitting and receiving resource allocation information in a wireless communication system supporting a D2D scheme according to an embodiment of the present disclosure has been described with reference to FIG. 8, and still another example of a process for transmitting and receiving resource allocation information in a wireless communication system supporting a D2D scheme according to an embodiment of the present disclosure will be described with reference to FIG. 9.

Figure 9:
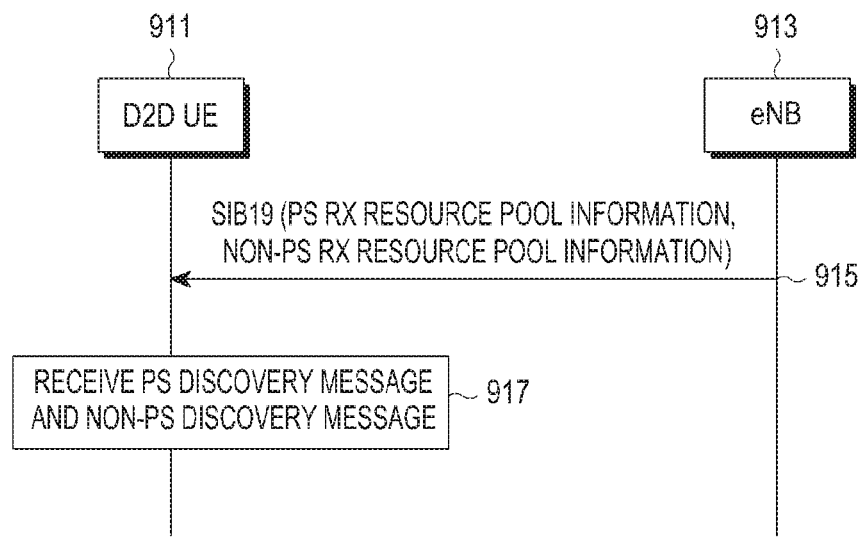
FIG. 9 schematically illustrates still another example of a process for transmitting and receiving resource allocation information in a wireless communication system supporting a D2D scheme according to an embodiment of the present disclosure.

FIG. 9 schematically illustrates still another example of a process for transmitting and receiving resource allocation information in a wireless communication system supporting a D2D scheme according to an embodiment of the present disclosure.

Referring to FIG. 9, an eNB 913 manages one or more PS RX resource pool(s) and one or more non-PS RX resource pool(s). Here, a PS RX resource pool includes at least one PS RX resource, and a PS RX resource denotes a resource used for receiving a PS discovery message. A non-PS RX resource pool includes at least one non-PS RX resource, and a non-PS RX resource denotes a resource used for receiving a non-PS discovery message. The eNB 913 may configure one or more PS RX resource pool(s) and one or more non-PS RX resource pool(s) based on various parameters for the wireless communication system, and a detailed description for a scheme for configuring the PS RX resource pool and the non-PS RX resource pool will be omitted herein.

The eNB 913 broadcasts information on one or more PS RX resource pool, i.e., PS RX resource pool information and information on one or more non-PS RX resource pool, i.e., non-PS RX resource pool information through a broadcast message, e.g., an SIB at operation 915. Non-PS RX resource pool indicates the resources by which the D2D UE is allowed to receive non-PS discovery messages while the D2D UE is in an RRC_IDLE state or an RRC CONNECTED state. A PS RX resource pool indicates the resources by which the D2D UE is allowed to receive PS discovery messages while the D2D UE is in an RRC_IDLE state or an RRC CONNECTED state. The SIB19 including the PS RX resource pool information and the non-PS RX resource pool information will be described below, so a detailed description thereof will be omitted herein.

Meanwhile, a D2D UE 911 reads an SIB19 broadcasted by the eNB 913. The D2D UE 911 may obtain one or more PS RX resource pool(s) and one or more non-PS RX resource pool(s) based on the PS RX resource pool information and the non-PS RX resource pool information included in the SIB19. The D2D UE 911 receives a PS discovery message using a PS RX resource included in the PS RX resource pool at operation 917. The D2D UE 911 receives a non-PS discovery message using a non-PS RX resource included in the non-PS RX resource pool at operation 917.

In an embodiment of the present disclosure, if a size of a PS discovery message is different from a size of a non-PS discovery message, the number of PRBs used for receiving a PS discovery message may be different from the number of PRBs used for receiving a non-PS discovery message. For example, the D2D UE 911 receives a PS discovery message using X PRBs from the PS RX resource pool. Alternatively, the D2D UE 911 receives a non-PS discovery message using Y PRBs from the non-PS RX resource pool.

Meanwhile, an SIB19 including PS RX resource pool information and non-PS RX resource pool information proposed in a wireless communication system supporting a D2D scheme according to an embodiment of the present disclosure will be described below.

Firstly, in an embodiment of the present disclosure, PS RX resource pool information and non-PS RX resource pool information may be indicated using a parameter SL-DiscRxPoolList-r12 and a parameter SL-DiscResourcePool-r12 included in an SIB19 as expressed in Table 3.

TABLE 3

```
SystemInformationBlockType19-r12 ::= SEQUENCE {
    discConfig-r12              SEQUENCE {
        discRxPool-r12          SL-DiscRxPoolList-r12
    }
}
SL-DiscRxPoolList-r12 ::=    SEQUENCE (SIZE (1..maxSL-RxPool-r12)) OF SL-DiscResourcePool-r12
SL-DiscResourcePool-r12 ::=  SEQUENCE {
    PS Indicator,
}
```

In Table 3, the parameter SL-DiscRxPoolList-r12 indicates non-PS RX resource pool information, and the parameter SL-DiscResourcePool-r12 indicates PS RX resource pool information. The parameter SL-DiscResourcePool-r12 includes a PS indicator.

Secondly, in an embodiment of the present disclosure, PS RX resource pool information and non-PS RX resource pool information may be indicated using a parameter discRxPool-r12 and a parameter discRxPoolPS-r12 included in an SIB19 as expressed in Table 4.

TABLE 4

```
SystemInformationBlockType19-r12 ::= SEQUENCE {
    discConfig-r12              SEQUENCE {
        discRxPool-r12          SL-DiscRxPoolList-r12
        discRxPoolPS-r12        SL-DiscRxPoolList-r12
    }
}
```

In Table 4, the parameter discRxPool-r12 indicates non-PS RX resource pool information, and the parameter discRxPoolPS-r12 indicates PS RX resource pool information.

In an embodiment of the present disclosure, a discovery resource or a PS discovery resource may be classified for relay discovery and group member discovery. For example, a discovery period of a resource pool for relay discovery may be shorter than a discovery period of a resource pool for group member discovery, or a discovery period of a resource pool for relay discovery may be longer than a discovery period of a resource pool for group member discovery.

In an embodiment of the present disclosure, a D2D discovery message may include an indicator for differentiating a PS discovery message and a non-PS discovery message.

In an embodiment of the present disclosure, D2D discovery messages with different sizes may be supported. In this case, a discovery resource request message, e.g., a SidelinkUEInformation message may include the number of TX resources required for transmitting each of D2D discovery messages, or sizes of D2D discovery messages.

In an embodiment of the present disclosure, an eNB may manage a discovery resource pool per each D2D discovery message size. So, the eNB allocates a discovery resource included in a discovery resource pool which corresponds to a size of a D2D discovery message or a discovery resource pool which corresponds to a size of a D2D discovery message based on the size of the D2D discovery message included in a discovery resource request message received from a D2D UE.

In an embodiment of the present disclosure, a D2D discovery message may a PS discovery message or a non-PS discovery message. In this case, a discovery resource request message may include information on a type of a D2D discovery message related to the discovery resource request message, e.g., information on indicating whether the D2D discovery message is a PS discovery message or a non-PS discovery message.

In an embodiment of the present disclosure, an eNB may manage a discovery resource pool which is unique to each of a plurality of discovery message types. So, the eNB allocates a discovery resource included in a discovery resource pool or a discovery resource pool to a D2D UE based on a D2D discovery message type received through a discovery resource request message received from the D2D UE.

In an embodiment of the present disclosure, an eNB may determine a size of a D2D discovery message based on a D2D discovery message type. So, the eNB may allocate a discovery resource or a discovery resource pool corresponding to each of D2D discovery message sizes.

In an embodiment of the present disclosure, a discovery period may be determined based on a D2D discovery message type.

Meanwhile, a scheme for detecting whether a carrier supports a PS discovery process or a non-PS discovery process in a wireless communication system supporting a D2D scheme according to an embodiment of the present disclosure will be described below.

In a network, a carrier may be configured for only a PS discovery process, only a non-PS discovery process, or all of a PS discovery process and a non-PS discovery process.

So, a D2D UE interested in transmitting a D2D discovery message needs to identify whether a discovery process supported in a carrier is a PS discovery process, a non-PS discovery process, or both of a PS discovery process and a non-PS discovery process. So, system information broadcasted on a carrier may include information indicating a type of a discovery process supported in the carrier, i.e., information indicating that the discovery process supported in the carrier is a PS discovery process, a non-PS discovery process, or both of a PS discovery process and a non-PS discovery process.

Alternatively, it may be indicated that the discovery process supported in the carrier is the PS discovery process, the non-PS discovery process, or both of the PS discovery process and the non-PS discovery process based on that the system information broadcasted on the carrier includes PS resource pool information, non-PS resource pool information, or both of PS resource pool information and non-PS resource pool information.

In an embodiment of the present disclosure, in a case that a carrier is a preconfigured PS carrier, a PS discovery process is supported on the carrier. If the carrier is not the preconfigured PS carrier, the PS discovery process is not supported on the carrier.

In an embodiment of the present disclosure, in a case that non-PS discovery resources are configured on a carrier, a non-PS discovery process is supported on the carrier.

For convenience, in an embodiment of the present disclosure, a case that one discovery resource is used has been described, however, it will be understood by those of ordinary skill in the art that one or more discovery resource may be used. For convenience, in an embodiment of the present disclosure, a case that one resource pool, e.g., a TX resource pool, an RX resource pool, or/and the like is used has been described, however, it will be understood by those of ordinary skill in the art that one or more resource pools may be used.

An inner structure of a D2D UE in a wireless communication system supporting a D2D scheme according to an embodiment of the present disclosure will be described with reference to FIG. 10.

Figure 10:
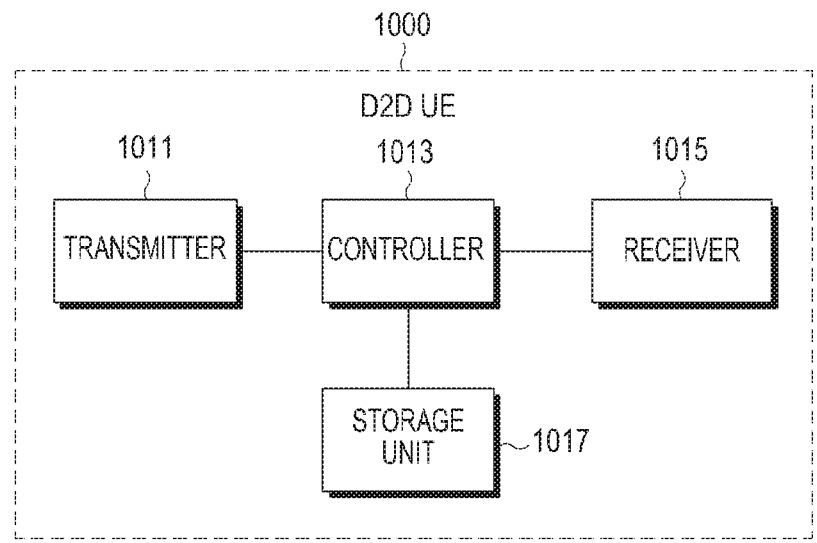
FIG. 10 schematically illustrates an inner structure of a D2D UE in a wireless communication system supporting a D2D scheme according to an embodiment of the present disclosure.

FIG. 10 schematically illustrates an inner structure of a D2D UE in a wireless communication system supporting a D2D scheme according to an embodiment of the present disclosure.

Referring to FIG. 10, a D2D UE 1000 includes a transmitter 1011, a controller 1013, a receiver 1015, and a storage unit 1017.

*189The controller 1013 controls the overall operation of the D2D UE 1000. More particularly, the controller 1013 controls the D2D UE 1000 to perform an operation related to an operation of transmitting and receiving a D2D discovery message in a wireless communication system supporting a D2D scheme according to an embodiment of the present disclosure. The operation related to the operation of transmitting and receiving the D2D discovery message in the wireless communication system supporting the D2D scheme according to an embodiment of the present disclosure is performed in the manner described with reference to FIGS. 1 to 9, and a description thereof will be omitted herein.

The transmitter 1011 transmits various signals and various messages, and the like to other devices, e.g., another D2D UE, an eNB, and the like included in the wireless communication system under a control of the controller 1013. The various signals, the various messages, and the like transmitted in the transmitter 1011 have been described in FIGS. 1 to 9 and a description thereof will be omitted herein.

The receiver 1015 receives various signals, various messages, and the like from other devices, e.g., another D2D UE, an eNB, and the like included in the wireless communication system under a control of the controller 1013. The various signals, the various messages, and the like received in the receiver 1015 have been described in FIGS. 1 to 9 and a description thereof will be omitted herein.

The storage unit 1017 stores a program related to an operation of transmitting and receiving a D2D discovery message in a wireless communication system supporting a D2D scheme according to an embodiment of the present disclosure which the D2D UE 1000 performs under a control of the controller 1013, various data, and the like.

The storage unit 1017 stores the various signals and the various messages which the receiver 1015 receives from the other devices, and the like.

While the transmitter 1011, the controller 1013, the receiver 1015, and the storage unit 1017 are described in the D2D UE 1000 as separate units, it is to be understood that this is merely for convenience of description. In other words, two or more of the transmitter 1011, the controller 1013, the receiver 1015, and the storage unit 1017 may be incorporated into a single unit.

The D2D UE 1000 may be implemented with one processor.

An inner structure of a D2D UE in a wireless communication system supporting a D2D scheme according to an embodiment of the present disclosure has been described with reference to FIG. 10, and an inner structure of an eNB in a wireless communication system supporting a D2D scheme according to an embodiment of the present disclosure will be described with reference to FIG. 11.

Figure 11:
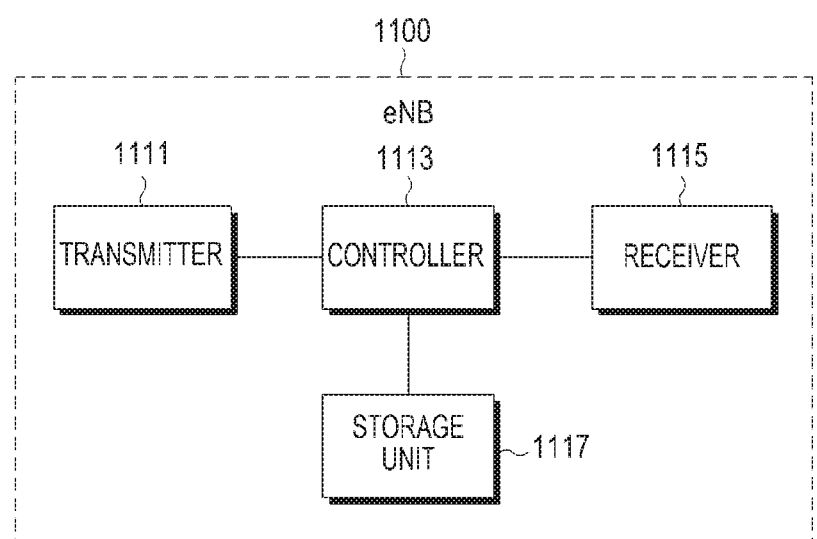
FIG. 11 schematically illustrates an inner structure of an eNB in a wireless communication system supporting a D2D scheme according to an embodiment of the present disclosure.

FIG. 11 schematically illustrates an inner structure of an eNB in a wireless communication system supporting a D2D scheme according to an embodiment of the present disclosure.

Referring to FIG. 11, an eNB 1100 includes a transmitter 1111, a controller 1113, a receiver 1115, and a storage unit 1117.

The controller 1113 controls the overall operation of the eNB 1100. More particularly, the controller 1113 controls the eNB 1100 to perform an operation related to an operation of transmitting and receiving a D2D discovery message in a wireless communication system supporting a D2D scheme according to an embodiment of the present disclosure. The operation related to the operation of transmitting and receiving the D2D discovery message in the wireless communication system supporting the D2D scheme according to an embodiment of the present disclosure is performed in the manner described with reference to FIGS. 1 to 9, and a description thereof will be omitted herein.

The transmitter 1111 transmits various signals and various messages, and the like to other devices, e.g., a D2D UE, another eNB, and the like included in the wireless communication system under a control of the controller 1113. The various signals, the various messages, and the like transmitted in the transmitter 1111 have been described in FIGS. 1 to 9 and a description thereof will be omitted herein.

The receiver 1115 receives various signals, various messages, and the like from other devices, e.g., a D2D UE, another eNB, and the like included in the wireless communication system under a control of the controller 1113. The various signals, the various messages, and the like received in the receiver 1115 have been described in FIGS. 1 to 9 and a description thereof will be omitted herein.

The storage unit 1117 stores a program related to an operation of transmitting and receiving a D2D discovery message in a wireless communication system supporting a D2D scheme according to an embodiment of the present disclosure which the eNB 1100 performs under a control of the controller 1113, various data, and the like.

The storage unit 1117 stores the various signals and the various messages which the receiver 1115 receives from the other devices, and the like.

While the transmitter 1111, the controller 1113, the receiver 1115, and the storage unit 1117 are described in the eNB 1100 as separate units, it is to be understood that this is merely for convenience of description. In other words, two or more of the transmitter 1111, the controller 1113, the receiver 1115, and the storage unit 1117 may be incorporated into a single unit.

The eNB 1100 may be implemented with one processor.

An embodiment of the present disclosure enables to transmit and receive a D2D discovery message in a wireless communication system supporting a D2D scheme.

An embodiment of the present disclosure enables to transmit and receive a D2D discovery message by considering all of a PS discovery process and a non-PS discovery process in a wireless communication system supporting a D2D scheme.

An embodiment of the present disclosure enables to transmit and receive a D2D discovery message thereby decreasing power consumption in a wireless communication system supporting a D2D scheme.

An embodiment of the present disclosure enables to transmit and receive a D2D discovery message thereby identifying a PS discovery message and a non-PS discovery message in a wireless communication system supporting a D2D scheme.

An embodiment of the present disclosure enables to transmit and receive a D2D discovery message by considering a network coverage in a wireless communication system supporting a D2D scheme.

An embodiment of the present disclosure enables to transmit and receive a D2D discovery message thereby decreasing interference due to transmission of a D2D discovery message in a wireless communication system supporting a D2D scheme.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital versatile disk (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of a base station in a wireless communication system, the method comprising:
   receiving, from a user equipment (UE), a discovery resource request message for requesting resources for discovery messages, wherein the discovery resource request message includes non-public safety (PS) resource request information when requesting the resources for non-public safety (PS) discovery messages, and PS resource request information when requesting the resources for PS discovery messages;
   allocating:
     at least one resource for the non-PS discovery messages when the non-PS resource request information includes information indicating a number of the non-PS discovery messages to be transmitted by the UE in a discovery period, and
     at least one resource for the PS discovery messages when the PS resource request information includes information indicating a number of the PS discovery messages to be transmitted by the UE in the discovery period; and transmitting, to the UE using a radio resource control (RRC) connection reconfiguration:
  when allocating the at least one resource for the non-PS discovery messages, first information indicating the at least one resource for the non-PS discovery messages, and
  when allocating the at least one resource for the PS discovery messages, second information indicating the at least one resource for the PS discovery messages, wherein the number of the non-PS discovery messages is related to a quantity of the resources required for transmitting the non-PS discovery messages and the number of the PS discovery messages is related to a quantity of the resources required for transmitting the PS discovery messages, and wherein the non-PS resource request information further includes information of a first frequency on which the UE transmits the non-PS discovery messages and the PS resource request information further includes information of a second frequency on which the UE transmits the PS discovery messages, the first frequency is different from the second frequency.

2. A method of a user equipment (UE) in a wireless communication system, the method comprising:
  transmitting, to a base station, a discovery resource request message for requesting resources for discovery messages, wherein the discovery resource request message includes non-public safety (PS) resource request information when requesting the resources for non-public safety (PS) discovery messages, and PS resource request information when requesting the resources for PS discovery messages; and
  receiving, from the base station, based on the non-PS resource request information, first information indicating at least one resource for the non-PS discovery messages and based on the PS resource request information, second information indicating at least one resource for the PS discovery messages using a radio resource control (RRC) connection reconfiguration, wherein the at least one resource for the non-PS discovery messages is allocated by the base station based on the non-PS resource request information including information indicating a number of the non-PS discovery messages to be transmitted by the UE in a discovery period and the at least one resource for the PS discovery messages is allocated by the base station based on the PS resource request information including information indicating a number of the PS discovery messages to be transmitted by the UE in the discovery period, wherein the number of the non-PS discovery messages is related to a quantity of the resources required for transmitting the non-PS discovery messages and the number of the PS discovery messages is related to a quantity of the resources required for transmitting the PS discovery messages, and wherein the non-PS resource request information further includes information of a first frequency on which the UE transmits the non-PS discovery messages and the PS resource request information further includes information of a second frequency on which the UE transmits the PS discovery messages, the first frequency is different from the second frequency.

3. A base station in a wireless communication system, the base station comprising:
  a transceiver; and
  at least one processor configured to:
    receive, via the transceiver from a user equipment (UE), a discovery resource request message for requesting resources for discovery messages, wherein the discovery resource request message includes non-public safety (PS) resource request information when requesting the resources for non-public safety (PS) discovery messages, and PS resource request information when requesting the resources for PS discovery messages;
    allocate at least one resource for the non-PS discovery messages when the non-PS resource request information includes information indicating a number of the non-PS discovery messages to be transmitted by the UE in a discovery period and at least one resource for the PS discovery messages when the PS resource request information including information indicating a number of the PS discovery messages to be transmitted by the UE in the discovery period; and
    transmit, via the transceiver to the UE using a radio resource control (RRC) connection reconfiguration:
      first information indicating the at least one resource for the non-PS discovery messages, and when allocating the at least one resource for the PS discovery messages, second information indicating the at least one resource for the PS discovery messages, wherein the number of the non-PS discovery messages is related to a quantity of the resources required for transmitting the non-PS discovery messages and the number of the PS discovery messages is related to a quantity of the resources required for transmitting the PS discovery messages, and wherein the non-PS resource request information further includes information of a first frequency on which the UE transmits the non-PS discovery messages and the PS resource request information further includes information of a second frequency on which the UE transmits the PS discovery messages, the first frequency is different from the second frequency.

4. A user equipment (UE) in a wireless communication system, the UE comprising:
  a transceiver; and
  at least one processor configured to:
    transmit, via the transceiver to a base station, a discovery resource request message for requesting resources for discovery messages, wherein the discovery resource request message includes non-public safety (PS) resource request information when requesting the resources for non-public safety (PS) discovery messages, and PS resource request information when requesting the resources for PS discovery messages; and
    receive, via the transceiver from the base station, based on the non-PS resource request information, first information indicating at least one resource for the non-PS discovery messages and based on the PS resource request information, second information indicating at least one resource for the PS discovery messages using a radio resource control (RRC) connection reconfiguration, wherein the at least one resource for the non-PS discovery messages is allocated by the base station based on the non-PS resource request information including information indicating a number of the non-PS discovery messages to be transmitted by the UE in a discovery period and the at least one resource for the PS discovery messages is allocated by the base station based on the PS resource request information including information indicating a number of the PS discovery messages to be transmitted by the UE in the discovery period, wherein the number of the non-PS discovery messages is related to a quantity of the resources required for transmitting the non-PS discovery messages and the number of the PS discovery messages is related to a quantity of the resources required for transmitting the PS discovery messages, and wherein the non-PS resource request information further includes information of a first frequency on which the UE transmits the non-PS discovery messages and the PS resource request information further includes information of a second frequency on which the UE transmits the PS discovery messages, the first frequency is different from the second frequency.

* * * * *